FIG. 1

INVENTORS
RUDOLPH S. PETERSEN
BENNY OLSEN

BY

ATTORNEY

INVENTORS
RUDOLPH S. PETERSEN
BENNY OLSEN
BY
ATTORNEY

FIG. 6.

INVENTORS
RUDOLPH S. PETERSEN
BENNY OLSEN

BY

ATTORNEY

FIG. 7.

INVENTORS
RUDOLPH S. PETERSEN
BENNY OLSEN
BY
ATTORNEY

FIG. 8.

June 13, 1967     R. S. PETERSEN ET AL     3,325,612
FLUID FLOW SENSING DEVICE Filed June 26, 1964     8 Sheets-Sheet 7

FIG. 9.

INVENTORS
RUDOLPH S. PETERSEN
BENNY OLSEN
BY
ATTORNEY

FIG. 10.

United States Patent Office 3,325,612
Patented June 13, 1967

3,325,612
FLUID FLOW SENSING DEVICE
Rudolph S. Petersen, Brookline, and Benny Olsen, Nashua, N.H., assignors to Sanders Associates, Inc., Nashua, N.H., a corporation of Delaware
Filed June 26, 1964, Ser. No. 378,328
18 Claims. (Cl. 200—81.9)

This invention relates to an improved flow sensor, particularly one adapted to translate a change in fluid flow into electrical signals and, more particularly, to snap action flapper-nozzle flow sensors adapted to provide an electrically controlled signal, also flow metering using inductance, capacitance and resistance readout.

Conventional in the prior art are expansible chamber and spool-valve types of flow sensors. In spool type devices a piston is slidably mounted in a passageway with the clearance between the piston and the walls of the passageway not being enough to allow any significant leakage of fluid. Such a device is very sensitive to dirt carried by the actuating fluid, which may work its way eventually into the clearance space to cause a drag on the piston, raising the fluid pressure and amount of flow needed to reciprocate the piston or in extreme cases completely wedging the piston to prevent any movement thereof. While filters have been used to prevent the accumulation of particles in the area of piston actuated flow sensors, they have not proved entirely satisfactory. The clogging of filter elements will in time cause a pressure drop across the filter, changing the source pressure and flow needed to actuate the spool. Magnetic traps have also been used on occasion to prevent the contamination of the fluid and the subsequent malfunctioning of the spool-spin mechanism used in systems now known to the art. However, the particles carried in the actuating fluid may not be attracted by a magnet if they are non-magnetic, such as aluminum filings. The problem is amplified by the extensive use of aluminum today in fluid flow designs. Also, minute particles which would be passed by nominal filtration will form silt on sliding surfaces.

Piston type flow sensors are also affected by "G" loads, particularly when used in high speed aircraft or rockets. It is almost impossible to position all of the flow sensors in a propulsion system so that they will not be seriously affected during blast-off or at any other time when accelerative loads are high.

Most of the fluid actuated flow sensors in use are bulky, complicated devices whose inherent inertia prevents the near instantaneous response necessary for satisfactory performance. Furthermore, these devices usually cannot be removed from the hydraulic circuit without completely dismantling the system.

While some of these problems are alleviated by the prior art types of drag plate type flow sensors, these have their own difficulties. While a drag plate may be designed to be light and simple, miniaturization thereof is prevented by the size of the fluid impinged plate or disc needed to actuate the plate when the valve must be designed to be actuated by low flows. Also, drag plate sensors are inherently insensitive to viscosity changes in the actuating fluid, reacting only to the pressure of the impinging fluid.

It is a general object of the present invention to provide flapper type flow sensors that will meet all of the above desideratum.

A more specific object of the present invention is the provision of a flow sensor that will be unaffected by solid particles carried in the actuating fluid and will continue to perform the designed functions regardless of the fluid contamination.

Another object of the present invention is the provision of a flow sensor that is insensitive to "G" loading and will operate efficiently and consistently under almost any condition of acceleration.

A further object of the present invention is the provision of a flapper fluid sensor for providing an electrical output which is a function of flow rate.

A further object of the present invention is the provision of a flapper flow sensor that is responsive to changes in temperature affecting the viscosity of the actuating fluid.

A still further object of the present invention is the design of a lightweight flapper flow sensor constructed to react almost instantaneously when the flapper plate is impinged upon by a jet of fluid of the designed force.

Yet another object of the present invention is to provide a simple transducer for transforming a fluid flow into an electrical signal wherein the structure is adaptable to miniaturization.

A further object of the present invention is the provision of a flapper flow sensor valve which is adapted to snap into the position in which the controlled, normally open and/or closed electric switch is closed and/or open when a jet of fluid of the designed flow impinges on the flapper plate.

Other objects, feature and advantages of the present invention will be apparent from the following description taken in conjunction with the accompanying drawings, wherein.

*Description of the flow sensor of FIGS. 1–5*

Figure 1:
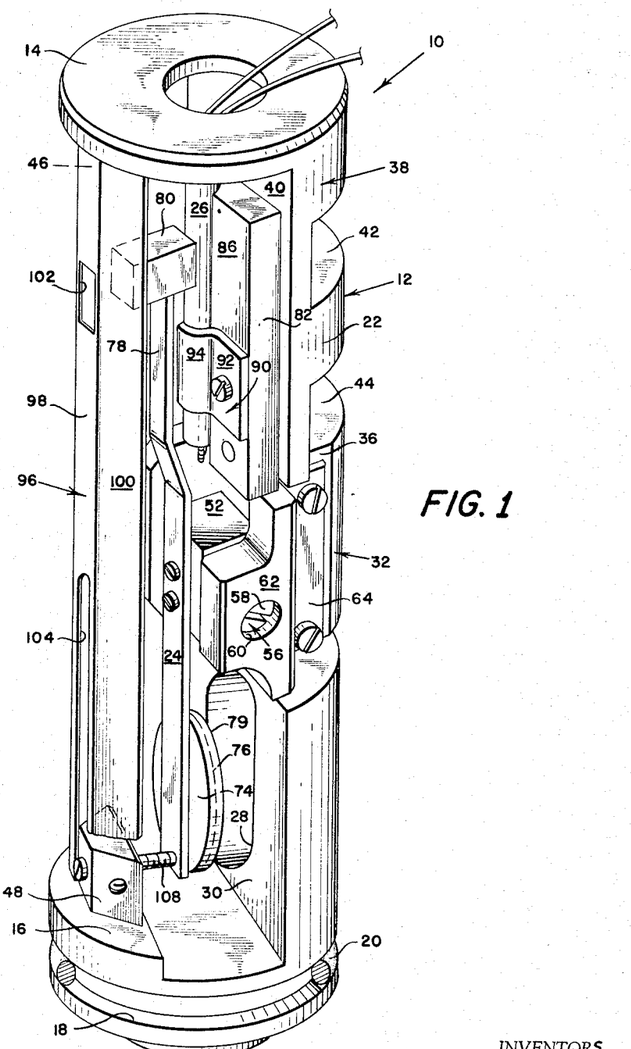
FIG. 1 is a perspective view of a first embodiment of the flapper actuated flow sensor, partially broken away, in a cylindrical housing adapted to be plugged into a hydraulic system.
Figure 2:
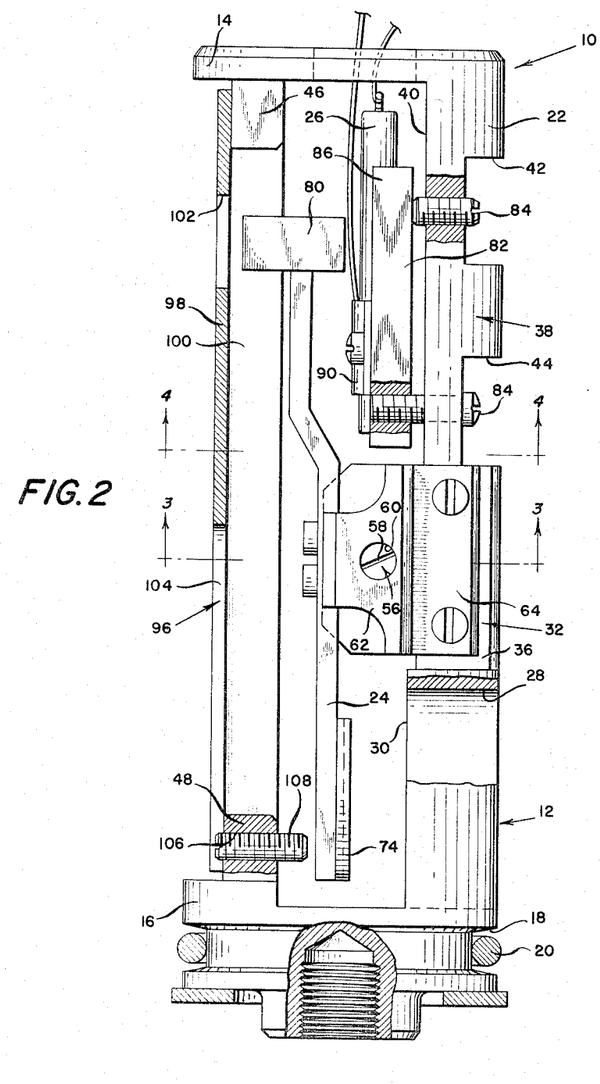
FIG. 2 is a side elevational view of the flapper actuated flow sensor of FIG. 1 illustrating the mounting of the elements in the cylindrical housing.

Referring now in detail to the drawings and with particular reference to FIGS. 1 and 2, there is illustrated a flapper actuated flow sensor, generally designated 10, encased within a cylindrical housing 12. The central portion of the cylindrical housing 12 is cut away to form a pair of circular end plates 14 and 16; the end plate 16 having a circumferential groove 18 for holding an O ring 20 adapted to seal the housing within a cylindrical aperture in the casing of a fluid system (not shown). Interconnecting the end plates 14, 16 at one side thereof is a bridging section 22 which pivotally mounts a flapper rod 24 and reed switch 26. Adjacent the end plate 16 is a generally elliptical hole 28 extending through the bridging section 22 from the curved outer surface to the planar inner surface 30. Centrally located along the bridging section 22, adjacent the elliptical aperture 28 is a cut-out pivot section 32 (FIG. 3) consisting of a planar upper surface 34 and a pair of parallel flats 36 cut into the sides of the bridging section 22. Between the pivot section 32 and the end plate 14 is a reed switch mounting section 38 having a planar mounting surface 40 on the bridging section 22 within the cylindrical housing 12, and a pair of rectangular slots 42 and 44 formed in the curved outer surface of the bridging section 22. A pair of opposed truncated triangular bosses 46 and 48 extend toward each other from the inner faces of the end plates 14 and 16.

The flapper rod 24 (FIG. 5) is bolted to a face of a pivot block 52 which is in turn press fitted on a first enlarged end 54 of a torison bar 56. The other enlarged end 58 of the torsion bar 56 is force fitted into an aperture 60 in an outwardly facing integral boss 62 formed on a torsion bar mounting block 64 bolted to one of the parallel flats 36 on the mounting portion 32 of the bridging section 22. The pivot block 52 is supported on a stub shaft 66 rotatably held by a ball bearing 68 rigidly held in a hole 70 in a complementary mounting block 72 which is bolted to the other flat 36 in the mounting portion 32 of the bridge section 22. The end of the flapper rod 24 adjacent the end plate 16 has a circular flapper disc 74 (FIGS. 1 and 2) affixed rigidly thereto on the side of the flapper rod 24 adjacent the elliptical aperture 28 in the bridging section 22. The disc 74 has a planar face 76 adjacent the elliptical aperture 28 with a circumferential rim 79 extending around the planar face 76 (FIG. 1). At the far end of the flapper rod 24, adjacent the end plate 14, is a section 78 offset away from the bridging section 22 of the housing 12. Fixed to the very end of the offset section 78 is a rectangular permanent magnet 80.

Fixed in the housing 12 adjacent the magnet 80, the reed switch 26 is clamped into an adjustable mounting block 82 (FIGS. 1, 2 and 4) held in a parallel spaced relationship to the planar mounting surface 40 by a pair of dowel pins (not shown) and a pair of screws 84 extending through the cut-out slots 42 and 44 and up into the lower surface of the block 82. The upper surface 86 of the block 82 has a semi-circular groove 88 extending the length thereof for receiving the cylindrical body of the reed switch 26. The reed switch 26 is held in place in the groove 88 by a spring clamp 90 having a planar section 92 thereof bolted to the upper surface 86 of the mounting block 82, and a curved clamping section 94 extending over the groove 88 and the included reed switch 26.

Figures 3, 4:
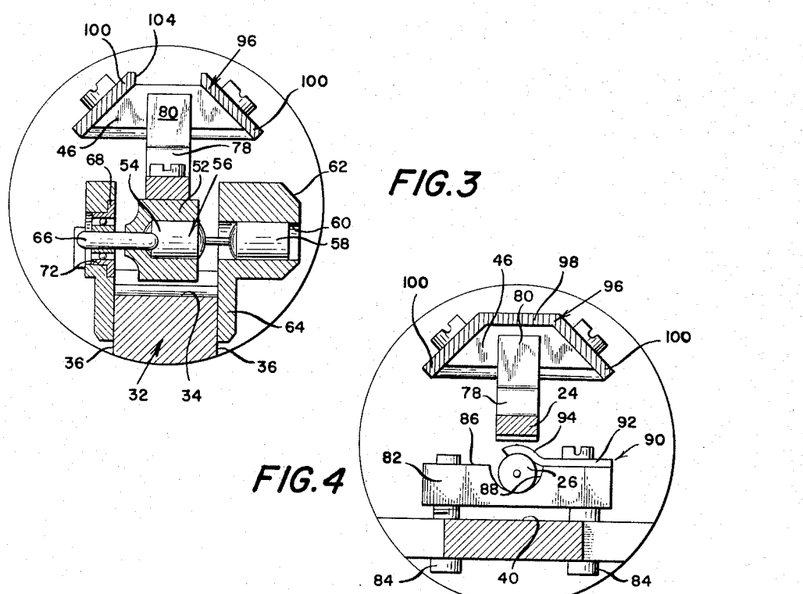
FIG. 3 is a cross-sectional view taken on lines 3—3 of FIG. 2 illustrating the structure for pivoting the flapper rod.
FIG. 4 is a cross-sectional view taken on lines 4—4 of FIG. 2 illustrating in particular, the mounting of a reed switch in the flow sensor.
Figure 5:
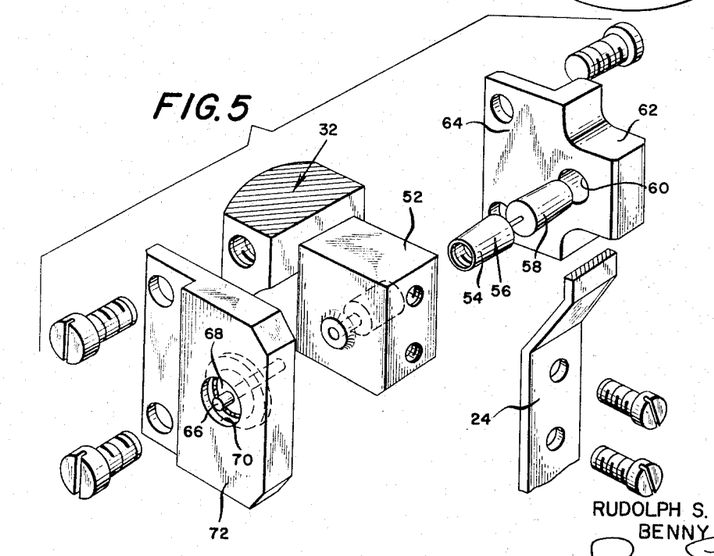
FIG. 5 is an exploded view of the structure for pivotally mounting the flapper rod.

An elongated sheet metal brace 96 extends between the bosses 46 and 48 on the end plates 14 and 16, respectively, of the housing 12 opposite the bridging section 22 and is longitudinally shaped to form a central planar section 98 and a pair of depending sides 100 conforming to the outer three flat sides of the bosses 46, 48. The brace 96 is bolted to the end plates 14, 16 through the depending sides 100 thereof, (FIG. 3). The central planar portion 98 of the brace 96 is windowed at 102 (FIGS. 1 and 2) near the end plate 14 to permit an end of the magnet 80 to lie in the plane thereof when the flapper rod 24 is in the rest position, while at the end of the rod 24, adjacent the end plate 16, the central section of the brace 96 is completely removed to a point opposite the pivot of the flapper rod 24 forming an elongated slot 104. The central flat on the boss 48 has a tapped hole 106 extending therethrough for receiving a limit screw 108 adapted to abut the flapper rod behind the flapper disc 74. The torsion bar 56 is adjusted so as to position the flapper rod 24, when in the rest position, with the near end of the magnet 80 lying in the window 102 in the brace 96 and the rimmed face 76 of the flapper disc 74 adjacent the elliptical aperture 28 in the housing 12.

In operation, the flow sensor 10 is positioned in a fluid system so that a jet of fluid (not shown) is directed through the aperture 28 and impinges on the face 76 of the disc 74. As the fluid flow increases, the flapper rod 24 pivots, loading the torsion bar 56, until the end of the flapper rod 24 approaches the limit screw 108. In normal operation, the flapper rod 24 does not actually abut the limit screw 108. The magnet 80, on the other end of the rod 24, is simultaneously positioned adjacent the reed switch 26, close enough to close the contacts thereof and allow an electric current to flow therethrough. The details of the reed switch are set forth in FIG. 6. The rim 79, around the edge of the flapper disc 74, increases the effective area of the disc surface 76 by preventing wash out and holding the pressure of the impinging fluid jet substantially constant across the surface 76 of the 74. Furthermore, the rim 79 acts as a stiffener for the disc 74 producing a higher strength to weight ratio than would be possible with a flat disc, and therefore permitting the use of a smaller, lighter member. The limit screw 108 may be driven further into the boss 48 to reduce the rotation of the flapper rod 24, or for an over stroke condition, the screw acts as a mechanical stop. The reed switch mounting block may be similarly adjusted away from the face 40 of the bridging section 22 to permit a greater range of adjustment of the relative position of the reed switch 26 and the magnet 80.

*Second embodiment*

In the second embodiment and subsequent embodiments, like elements will have the same reference numerals.

Figure 6:
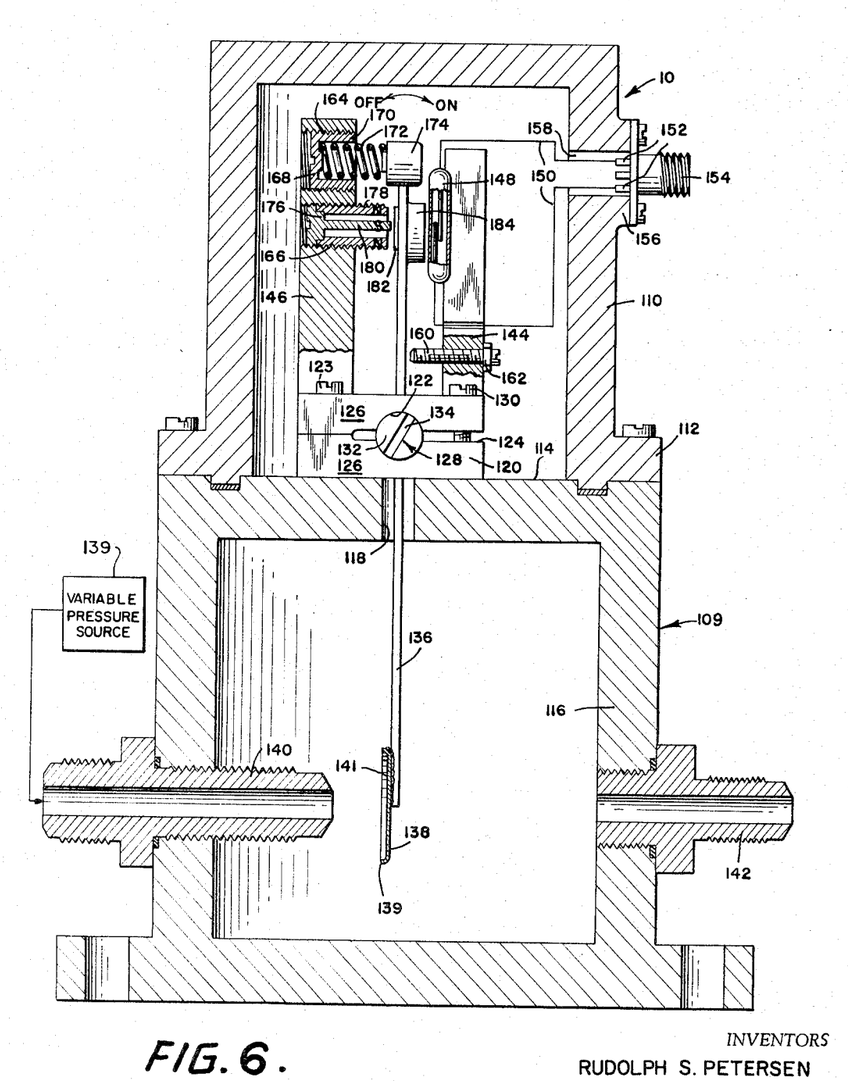
FIG. 6 is a side elevational view of a second embodiment of the invention.

FIG. 6 illustrates a second embodiment of the invention wherein the flow sensor 10 is arranged within a self contained housing. The composite housing 109 consists of a cylindrical cover 110 bolted, by means by a circumferential flange 112 adjacent its open lower end, to the upper surface 114 of a fluid jet chamber 116 and interconnected therewith by a concentric hole 118 through the upper surface 114. Adjacent the hole 118 is a pillar block 120 consisting of a pair of horizontally stacked fingers 126 held tightly together at one end by a bolt 123 extending into the upper surface 114 of the chamber 116. The other ends of the fingers 126 are spaced apart by a slot 124. A circular cut-out 122, extending across the slot 124, defines an adjustable mounting for a head 132 of a torsion bar 128. The torsion bar head 132 is held tightly in place by a screw 130 extending across the slot 124 between the fingers 126 to draw the fingers 126 together so that the defining walls of the hole 122 will grip the head 132 of the torsion bar 128. A slot 134 extends across the top of the head 132 of the torsion bar 128 in order to facilitate the rotation of the torsion bar 128 for adjustment purposes when the screw 130 has been loosened.

A flapper rod 136 is pivoted on the end of the torsion bar 128 opposite the head 132 and extends upward into the cylindrical cover 110 and downward through the hole 118 into the fluid jet chamber 116. A rimmed flapper disc 138 is centrally fixed to the end of the flapper rod 136 extending into the fluid jet chamber 116, with the circumferential rim 139 extending outwardly of the face 141 away from the rod 136.

An inlet jet nozzle 140 extends radially through the outer wall of the chamber 116 with the axis of the nozzle 140 perpendicular to the rimmed face 141 of the disc 138. Diametrically opposed to the inlet jet nozzle 140 is an outlet port nozzle 142 extending through the outer wall of the chamber 116. Both the inlet and outlet nozzles 140, 142 are adapted to have fluid lines (not shown) attached to the outwardly extending ends thereof.

A pair of upstanding bars 144 and 146 are perpendicularly mounted on the upper surface 114 of the chamber 116 on either side of the upper end of the flapper rod 136. The bar 144 carries an elongated reed switch 148 affixed near its upper end in a vertical position between the bar 144 and the flapper rod 136.

Electrical wires 150 extend from the ends of the reed switch 148 and are soldered to the terminals 152 of a waterproof male electrical connector 154 mounted on a cylindrical boss 156 on the outer wall of the cylindrical cover 110, extending through a coaxial hole 158 therein.

Below the reed switch 148 and extending through the bar 144 toward the flapper rod 136 is a limit bolt 160 held in place by a lock nut 162 tightened down against the surface of the bar 144.

The other upstanding bar 146 has upper and lower tapped holes 164 and 166 respectively extending therethrough with the axis of each hole 164, 166 intersecting the axis of the flapper rod 136. Screwed into the upper tapped hole 164, from the outer surface of the bar 146, is an adjustable biasing means 168 consisting of a threaded, inwardly facing, cup member 170 containing one end of a coil spring 172 fitted therein. The spring 172 is compressed between the cup 170 and an enlarged upper end 174 of the flapper rod 136, biasing the upper end of the rod 136 toward the right (FIG. 6). A snap action device 176 is threaded through the lower hole 166 in the bar 146. The snap action device 176 consists of an outer, hollow, tubular magnet 178 with its N pole facing inwardly, and a central rod like magnet 180 with its S pole facing inwardly. Mounted adjacent the magnetic snap action device 176, on the flapper rod 136 is a circular iron plate 182 designed to complete the magnetic link across the magnets 178, 180 when the flapper rod 136 is rotated toward the left to its rest position in which the plate 182 extends across the face of the snap action device 176. The snap action device 176 can also be adjusted into or out of the bar 146 to adjust the rest position of the flapper rod 136. Mounted on the flapper rod 136, opposite to the plate 182 and adjacent the reed switch 148 is a permanent magnet 184.

When the flapper rod 136 is in the rest position, the iron plate 182 is spaced away from the magnets 178 and 180. The iron plate 182, in order to make a magnetic contact with the magnets 178 and 180, must overcome, when in the rest position, a spring force of restraining spring 172.

It should be noted that when the flapper rod 136 is in the rest position, the reed switch 148 with its reeds located therein is under the influence of magnet 184 which magnetically draws the two reeds of the reed switch 148 into contact thereby completing the circuit. The wires 150 from reed switch 148 pass outwardly through the cylindrical cover 110 to actuate a mechanism (not shown) which will indicate that there is known the presence of flow when the unit is in the rest position. When a flow of fluid appears in the nozzle 140 and impinges upon the rim face 141 of the disc 138 with sufficient pressure to cause the rod 136 to move to the right, the spring force of spring 172 is overcome; and as the iron plate 182 approaches the magnets 178 and 180, the magnetic force acting thereon increases greatly and the iron plate 182 is snapped into abutting contact with the magnets 178, and 180. In so contacting the magnets 178 and 180, the magnetic force of magnet 184 decreases its action upon the reed switch 148 and the reeds therein move apart thereby interrupting the flow of current through the switch and bringing about an interruption of the externally connected apparatus which thereby indicates that flow has started to progress. The limit screw 160 is threaded through the bar 144 far enough to prevent the magnet 184 from actually striking the reed switch 148 yet allowing it to come close enough to close the contacts thereof. A further preloading of the flapper rod can be obtained through the adjustment of the head 132 of the torsion bar 128 in the pillar block 120. To actuate the flow switch, a jet of fluid from a variable pressure source 139, of at least a designed minimum force, impinges on the disc 138 from the nozzle 140 and the spent fluid exits through nozzle 142. An accelerative force will not affect the flapper rod 136 due to the weighted head 174 on its upper end which counterbalances the weight of the lower portion of the rod 136 and the disc 138.

Figure 7:
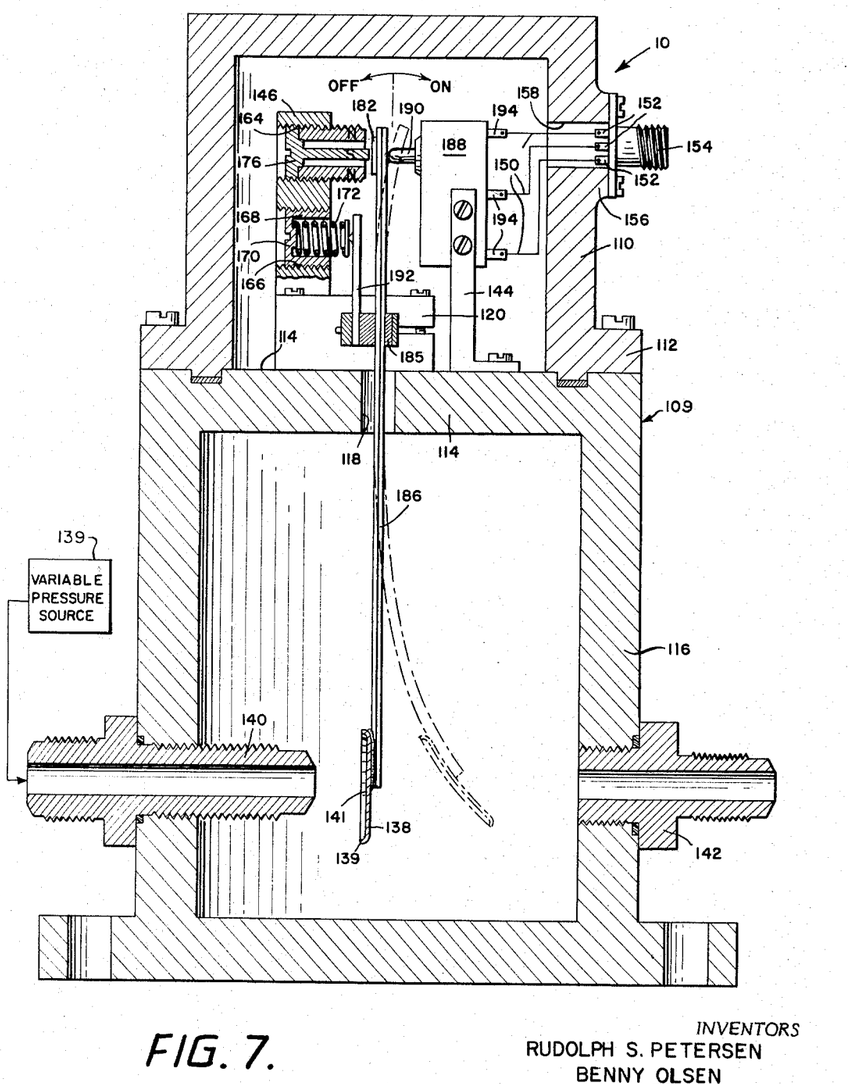
FIG. 7 is a side elevational view of a third embodiment of the invention.

The modified flow switch 10 of FIG. 7 is similar to that of the second embodiment depicted in FIG. 6 and also has a composite housing 109 consisting of a cylindrical cover 110 bolted by means of a circumferential flange 112 adjacent its open lower end, to the upper surface 114 of a fluid jet chamber 116 and interconnected therewith by a concentric hole 118 through the upper surface 114.

Adjacent the hole 118 is a pillar block 120 similar to that of FIG. 6 for adjustably mounting the torsion bar head (not shown). The other end of the torsion bar rigidly mounts a pivot block 185 having a flapper rod 186 affixed thereto, the flapper rod 186 extending upward into the cover 110 and downward through the hole 118 into the fluid jet chamber 116.

The flapper rod 186 consists of a temperature sensitive bimetallic rod with the two strips arranged so that the flapper rod 186 will curve within the plane defined by the pivoting of the rod 186 on the torsion bar. A rimmed flapper disc 138 is centrally fixed to the end of the flapper rod 186 extending into the fluid jet chamber 116, with the circumferential rim 139 of the disc 138 extending outwardly of the face 141 away from the rod 186.

An inlet jet nozzle 140 extends radially through the outer wall of the chamber 116 with the axis of the nozzle 140 perpendicular to the rimmed face 141 of the disc 138. Diametrically opposed to the inlet jet nozzle 140 is an outlet port nozzle 142 also extending through the outer wall of the chamber 116. This outlet need not be opposite the nozzle 140, the only requirement being the presence of an outlet somewhere to vent the fluid that impinges on disc 138.

A pair of upstanding bars 144 and 146 are perpendicularly mounted on the upper surface 114 of the chamber 116 on either side of the end of the flapper rod extending into the cover 110. The bar 144 carries a microswitch 188 with its plunger 190 extending toward the adjacent face of the flapper rod 186. The upstanding bar 146 has upper and lower tapped holes 164 and 166, respectively, extending therethrough with the axis of each hole 164, 166 intersecting the axis of the flapper rod 186. Screwed into the lower tapped hole 166 from the outer side of the bar 146 is an adjustable biasing means 168 consisting of an inwardly facing cup member 170 containing one end of a coil spring 172 fitted therein. The spring 172 is compressed between the cup 170 and the free end of a support arm 192 mounted in the pivot block 185 parallel to the flapper rod 186. A snap action device 176, similar to that of the modification of FIG. 6, is screwed through the upper hole 164 in the bar 146. Mounted on the flapper rod 186, adjacent the snap action device 176 is a circular plate 182 used to complete the magnetic circuit.

Electrical wires 150 are soldered to terminals 194 of the microswitch 188 and also to terminals 152 of a waterproof male electrical connector 154 mounted on a cylindrical boss 156 on the outer wall of the cover 110 and extending through a coaxial hole 158 therethrough.

The flapper rod 186, as shown in solid lines in FIG. 7, is in the actuated position at the desired operating temperature and viscosity of the actuating fluid. As the temperature of the fluid jet rises, and the viscosity of the fluid goes down, the rod 186 will bow into the position shown in phantom. This has been greatly exaggerated for purposes of illustration only. In actual practice, the movement is slight, the prime consideration being that the flapper rod 186 moves just enough to compensate for the change in viscosity.

The flapper rod 186 is comprised of two bimetallic strips which function, when heated, to force the bimetallic strips in the form of the rod 186 to a position dependent upon the amount of heat applied. It is therefore seen that as the temperature of the fluid increases, the rod 186 with its related flapper disc 138 bends away from the nozzle 140. Simultaneously with the bending away of the rod 186, the upper portion of the rod, which is shown in phantom lines, continues to hold the button 190 in an actuated position due to its bending in response to a temperature increase. It will therefore be seen that in order to produce movement of the button 190 to an "off" position, there will be required a jet stream from nozzle 140 of sufficient strength impinging upon the flapper disc 138 in its phantom position; and this force will have to be great enough to cause the upper portion of the rod 186, which is holding the button 190 of the microswitch 188 in an actuated position away from the button 190 and into an "off" position, to move against the magnets mounted in element 146.

While the above description is drawn to an arrangement in which the entire rod 186 is comprised of two bimetallic strips, the device will also operate if only the portion of the rod 186 from the block 185 downwardly is comprised of the bimetallic strips. This, of course, will require that the jet stream from the nozzle 140 be of a force less than the situation above described where both the top portion and the bottom portion of the flapper rod 186 are of bimetallic material. It should be recognized that while no weight is shown affixed to the top portion of the rod 186, a weight may be added to aid in compensating for vibrations and accelerations, the weight acting to counteract the forces experienced by the disc 138. By a correct choice of materials and dimensions, the increase in fluid pressure required can be made to vary linearly with the viscosity of the actuating fluid.

There has been provided a flow sensor of a compact design which when constructed of aluminum, weighs less than an ounce for a unit having a diameter of ¾" and a length of 2⅜". The unit as designed will withstand 25 g's acceleration without malfunction, and a vibration of 10 g at 2000 c.p.s.

Figure 8:
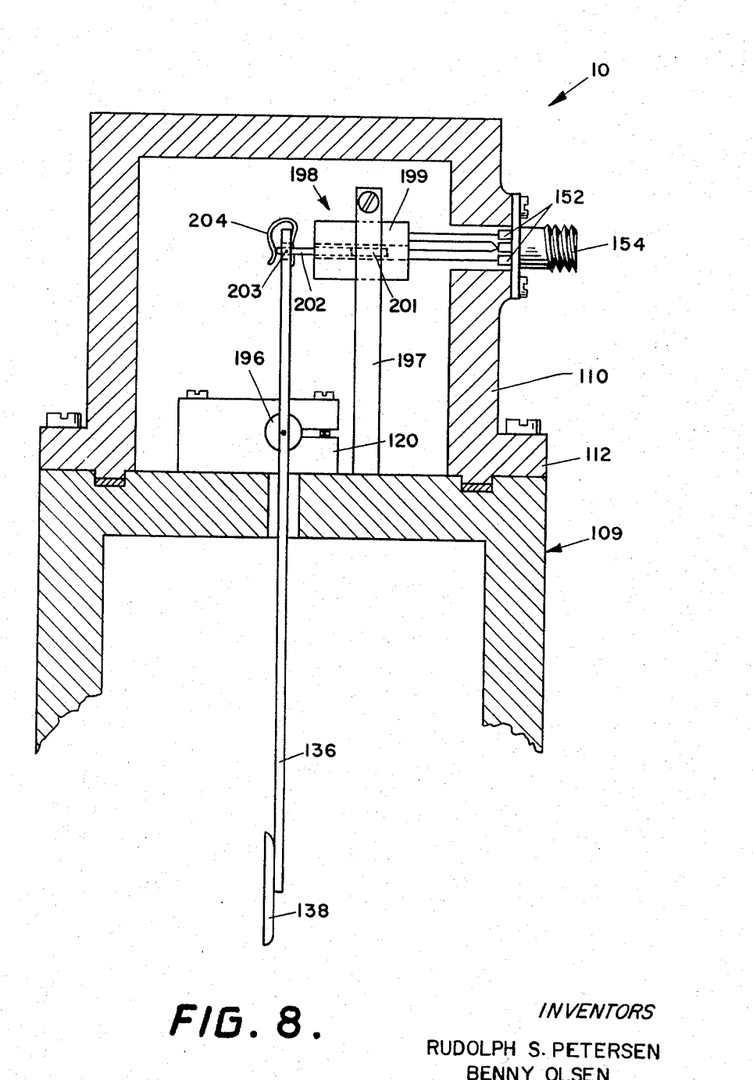
FIG. 8 is a partial section of a fourth embodiment of the invention.

Reference is now made to FIG. 8 in which there is shown another embodiment of this invention. This embodiment and the embodiments depicted in FIGS. 9 and 10 set forth another unique aspect of the invention in that these three embodiments illustrate a flow measuring device or metering unit.

Referring specifically now to FIG. 8, there is illustrated flow sensor 10 which has a composite housing 109 of the same type illustrated in FIG. 7 and a cover 110 with its related circumferential flange 112 secured to the top of the composite housing 109. Mounted within the cover 110 is a pillar block 120 which has securely fastened therein a torsion bar 196 which in turn has mounted thereon a flapper rod 136 which has at its lower end a rimmed flapper disc 138 which will cooperate with a jet stream not illustrated in this figure but shown in the previous figures described.

At the upper end of the flapper rod 136, there is pivotally mounted a rod 202 at pivot pin 203. At the end of the rod 202, there is an iron core element 201 which functionally cooperates with a cylindrical wire coil 199 to provide an inductance readout. The cylindrical wire coil 199 is mounted on a support 197. Mounted at the upper end of the rod 136, there is an anti-backlash spring element 204 which is secured to the rod 136 in a manner not shown, but riveting or welding to the rod 136 would be practical means to accomplish the securing of the anti-backlash spring element 204. A portion of this anti-backlash element 204 rests on one end of the rod 202. The spring action of the anti-backlash element 204 tends to control and dampen out sudden movements or vibrations that would cause movement of the rod 202 and its related iron core 201. The iron core 201 cooperates with the coil in the manner of any standard inductance device and provides a change in inductance as the iron core moves through the center of the cylindrical wire coil 199. This movement of the iron core 201 is predicated upon the rate at which the fluid impinges upon the flapper disc 138.

The rotary movement to be imparted to the rod 136 and its flapper disc 138 is controlled by the degree of spring torque present in the torsion bar 196, and the reading obtained, of course, will be a function of the spring rate of the torsion bar 196 and the inherent parameters in the inductance readout unit 198. The change in inductance that appears as a result of movement of the iron core 201 of the inductance readout unit 198 is translated by wire to the terminals 152 and thence to a male electrical connector which is secured to an additional measuring device not shown in this figure.

Figure 9:
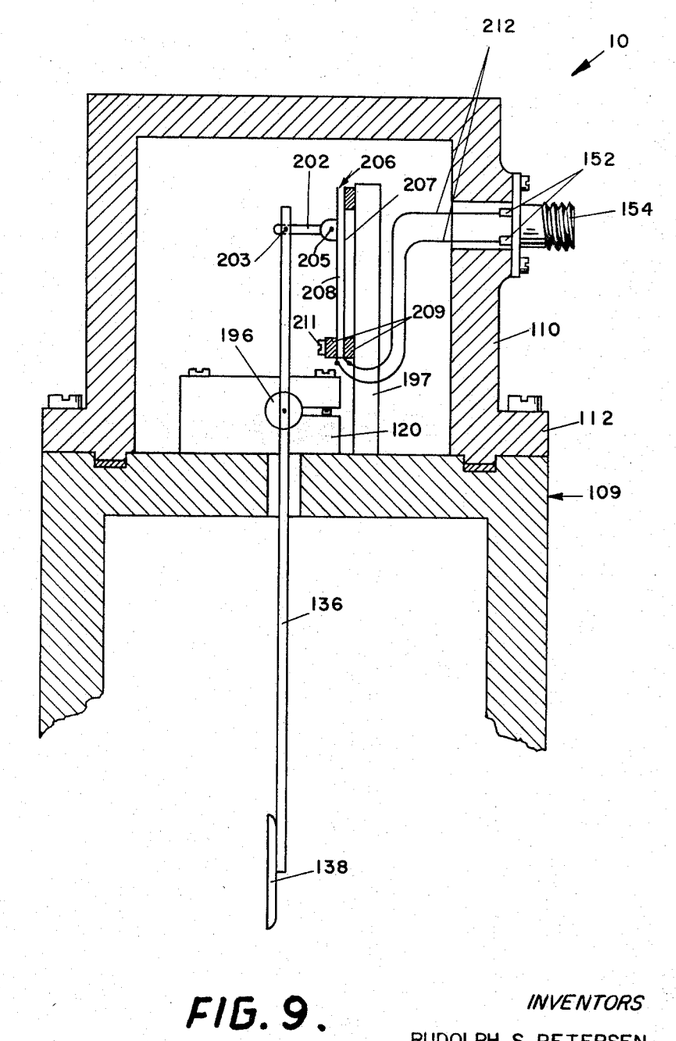
FIG. 9 is a partial section of a fifth embodiment of the invention.

Reference is now made to FIG. 9 which illustrates a capacitance flow detection arrangement in which there is mounted a support element 197 which is secured by a screw (not shown) to the composite housing 109. At the upper end of the support element 197, there is a capacitance readout unit 206 which is made up of capacitive elements 207 and 208, the lower ends of these elements being insulated from the support element 197 by insulating elements 209 secured to the support element 197 by the screw 211. At the upper end of the capacitive element 208 there is a pivot point 205 which has secured thereto a rod 202 which has a pivot pin 203 at the flapper rod 136.

It will be noted in this embodiment that there is no need for an anti-backlash mechanism because there is no contact between the capacitive elements 207 and 208. This capacitance readout functions when a flow of fluid (not shown) impinges upon the flapper disc 138 causing it to move to the right and thereby causing the torsion bar 196 to flex, which in turn moves the upper end of the flapper rod 136 to the left. This movement to the left just noted produces a change in capacitance between the capacitive elements 207 and 208, which change in capacitance is translated via the electrical leads 212 to the terminals 152 and thence to the male connector 154. The output from the male connector 154 is then a measure of the varying capacitance present between the capacitive elements 207 and 208 which affords an indication of the rate of fluid impinging upon the flapper disc 138.

Figure 10:
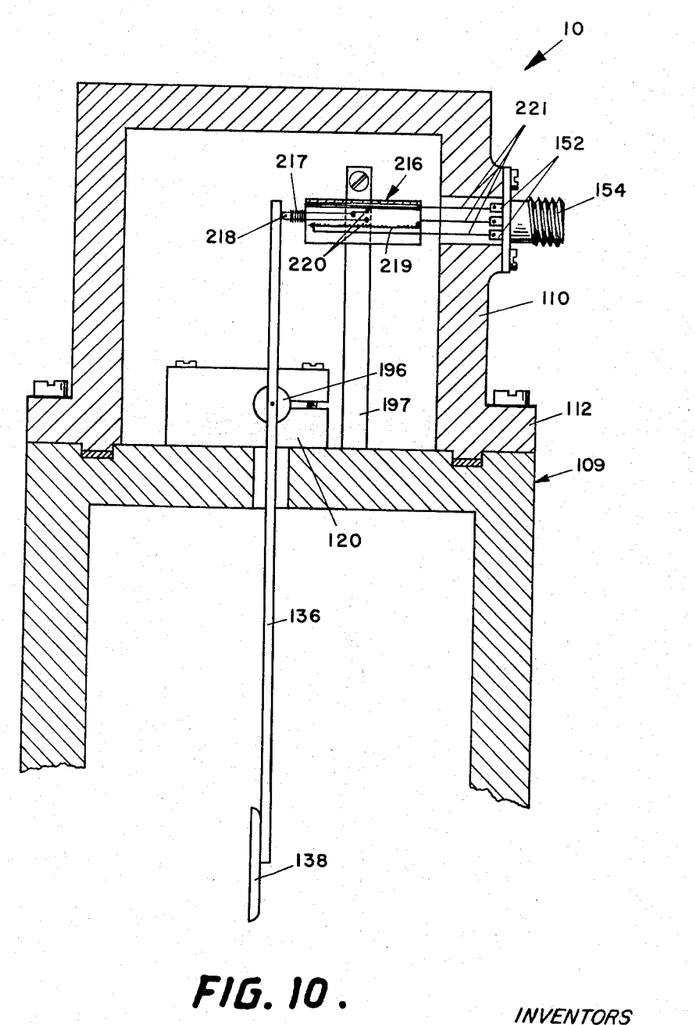
FIG. 10 is a partial section of a sixth embodiment of the invention.

Reference is now made to FIG. 10 where there is illustrated a resistive readout or potentiometer type readout device to provide a reading which measures the rate of flow of fluid impinging upon the rimmed flapper disc 138.

As in the last two figures, a support 197 has mounted therein a potentiometer or resistive type pickup 216 which is comprised of a resistance element 219 which cooperates with the movable wiper element 220. To the left of the resistive pickup there is the anti-backlash spring 217 which functions to provide a constant spring force to be present during all movement of the wiper element 220, thereby providing for the removal of any backlash that might appear when the flapper disc 138 and related flapper rod 136 are moved to the right, as when there is present a fluid stream impinging upon the flapper disc 138. Electrical leads 221 translate the output from the resistive pickup 216 to terminals 152 and to male electrical connector 154.

As can be seen from the above, the invention described has the ability to provide a measure of the presence of fluid flow and also of the rate at which it is flowing. It is to be understood that each of the last three embodiments could each have incorporated therein bimetallic elements of the type called for in FIG. 7 and thereby provide a rate of flow detector that takes into account changes in the viscosity of the fluid as the temperature changes.

It will be obvious to those skilled in the art that various changes may be made without departing from the spirit of the invention and therefore the invention is not limited to what is shown in the drawings and described in the specification but only as indicated in the appended claims.

What is claimed is:

1. A fluid flow sensing device comprising, a housing, a flapper rod, means for pivoting said flapper rod in said housing and biasing said rod into a normal switch "on" position, planar surfaced flapper rod actuating means on a first portion of said flapper rod, switch actuating means on a second portion of said flapper rod, a source of fluid under variable flow, inlet port means for directing said fluid under pressure in the form of a jet, toward said planar surface on said first portion of the flapper rod, to impinge on the planar surface perpendicularly thereto, to pivot said flapper rod out of its normal switch "on" position and into a switch "off" position, switch means mounted on said housing in a position to coact with the switch actuating means on said flapper rod when said rod is in its normal switch "on" position and not to coact with the switch actuating means on said flapper rod when said rod is in its switch "off" position, said flapper rod consisting of a bimetallic element whereby said fluid flow sensing device compensates for changes in temperature and viscosity of the fluid.

2. The fluid flow sensing device of claim 1 wherein there is a rim means associated with the planar surfaced actuating means for maintaining a substantially constant fluid flow across the planar surface thereof.

3. The fluid flow sensing device of claim 1 wherein there is a snap action device associated with said flapper rod for holding said rod in the normal switch "on" position until the force of the jet of fluid under pressure is great enough to suddenly release the snap action device and pivot the rod into the switch "off" position, said snap-action device consisting of a first portion fixed to said housing and a second portion fixed to said flapper rod.

4. The fluid flow sensing device of claim 3 wherein the first portion of the snap action device consists of a pair of magnets with a pole of each magnet extending toward the flapper rod, the poles of each of the magnets extending toward the flapper rod being of opposite polarity, said second portion of the snap action device consisting of a means for bridging said extended poles of said magnets when said flapper rod is in the "off" position, said bridging means being a material of high magnetic permeability whereby the bridging means completes the magnetic circuit between said magnets when the flapper rod is in the "off" position.

5. The fluid flow sensing device of claim 3 wherein there is an adjustable flapper rod biasing means extending between the flapper and a fixed portion of said housing, said biasing means consisting of a cup shaped member and a coil spring, means for moving said cup shaped member toward or away from said flapper rod, said spring being held at one end in said cup and at the other end by said flapper rod whereby the adjustment of the spring length by adjusting the position of the cup shaped member adjusts the force necessary to release the snap action device.

6. The fluid flow sensing device of claim 1 wherein there is a means on said flapper rod for adapting the rod to be insensitive to accelerative forces, said last recited means being a weight fixed on the flapper rod in a position so that forces acting on the rod above the pivot means equal the forces acting on the rod below the pivot means during any acceleration of the said device.

7. A fluid flow sensing device comprising, a housing, a flapper rod, means for pivoting said flapper rod in said housing and biasing said rod into a normal switch "on" position, adjustment means in said pivot means for adjusting the normal position of said flapper rod, a flapper rod actuating means on a first portion of said flapper rod, switch actuating means on a second portion of said flapper rod, a source of fluid under variable flow, inlet port means for directing the fluid under pressure, in the form of a jet, toward said actuating means to impinge thereon and pivot said flapper rod out of its normal switch "on" position and into a switch "off" position, switch means mounted on said housing in a position to coact with the switch actuating means when the flapper rod is in its normal switch "on" position and not to coact with the switch actuating means when the flapper rod is in its normal switch "off" position, the longitudinal axes of said switch means and said flapper rod being substantially parallel to one another, and means adjustably mounted on said housing abutting the flapper rod when the rod is in the switch actuating position and holding the switch actuating means spaced from said switch means while permitting the switch actuating means to actuate the switch means.

8. A fluid flow sensing device as recited in claim 7 in which the switch is a reed switch, said reed switch having a pair of contacts, a source of electric potential connected across said contacts, said switch actuating means consisting of a magnet whereby the contacts of the reed switch are drawn closed by the proximity of the switch actuating magnet to pass an electric current through said reed switch.

9. A fluid flow sensing device as recited in claim 7 wherein said switch mounting means consists, in part of a means for adjusting said switch means toward the flapper rod whereby the adjustment means compensates for manufacturing variations in the switch means and the switch actuating means.

10. The fluid flow sensing device of claim 1 wherein the switch actuating means is a flat plate having a circumferential rim extending around said plate toward the inlet port means.

11. A fluid flow sensing device comprising, a housing, a fluid flow sensing chamber in said housing, a flapper rod, means pivotally mounting said flapper rod in said housing, a first and second end on said flapper rod, said first end of said flapper rod extending into said fluid flow sensing chamber, a flapper rod actuating means mounted on said first end of said flapper rod in said fluid flow sensing chamber, a source of fluid under pressure, an inlet port means, said inlet port means being connected to said source of fluid under pressure for directing the fluid under pressure, in the form of a jet, into the flow sensing chamber and to impinge against the flapper rod actuating means, to pivot said flapper into a switch "off" position from a normal position, outlet port means in said flow sensing chamber for exhausting spent fluid, the second end of the flapper rod extending away from said flow sensing chamber, a cover means enclosing said second end of said flapper rod, said cover means being mounted on said housing, a switch actuating means mounted on said second end of said flapper rod, a switch means mounted in said cover means on said housing adjacent said flapper rod, said flapper rod mounted switch actuating means actuating said switch only when said switch actuating means is positioned adjacent said switch means, mounting means on said housing within said cover means, an adjustable snap action device mounted on said mounting means, said snap action device consisting of a first portion and a second portion, the first portion of the snap action device being fixed to said mounting means, the second portion of said snap action device being fixed on said flapper rod, said first and second portions of said snap action device being in an abutting relationship when the flapper rod is in the normal position, biasing means mounted on said mounting means, said biasing means contacting said flapper rod to modify the action of the snap action device, whereby the impinging of a jet of fluid under pressure on the flapper actuating means causes the flapper rod to snap over from a normal switch "on" position to a switch "off" position, said position at which said snap over occurs being jointly controlled by the snap action device and the biasing means.

12. The fluid flow sensing device of claim 11 wherein there is an adjustable limit means mounted on said housing in said cover means, said limit means adapted to abut the flapper rod when the rod is in the switch actuating position to hold the switch actuating means at a distance from said switch means.

13. The fluid flow sensing device of claim 12 wherein said flapper rod consists of a bimetallic element whereby said flapper rod compensates for changes in temperature and viscosity of the fluid under pressure.

14. A variable rate of fluid flow sensor capable of detecting and indicating the rate of said flow comprising, a housing, a flapper rod, means connected to said flapper rod to provide a pivot for said flapper rod in said housing while simultaneously providing a biasing force to said flapper rod to tend to maintain said flapper rod in a normal neutral position, said flapper rod having on a first portion of said flapper rod means connected thereto and movable through a distance determined by any movement of said flapper rod, a variable readout means in electrical cooperation with said movable means which is connected to said flapper rod to provide a signal representative of flapper rod movement, said flapper rod having a flapper rod actuating means on a second portion of said flapper rod, a source of fluid under variable flow which variable flow is to be measured, means connected to said housing to deliver said fluid to said flapper rod actuating means whereby said flapper rod is caused to move and said flapper rod movement is translated to said flapper rod's first portion to produce a movement and therefore a signal proportional to said movement and said rate of flow from said variable readout means.

15. The combination set forth in claim 14 wherein said pivot is located intermediate said flapper rod's first and second portions.

16. The combination set forth in claim 14 wherein said variable readout means is a variable resistance type device.

17. The combination set forth in claim 14 wherein said variable readout means is a variable capacitance type device.

18. The combination set forth in claim 14 wherein said variable readout means is a variable inductance type device.

References Cited

UNITED STATES PATENTS

| | | | |
|---|---|---|---|
| 1,205,530 | 11/1916 | Hall | 200—81.9 X |
| 3,113,189 | 12/1963 | Porwancher | 200—81.9 |

BERNARD A. GILHEANY, *Primary Examiner.*

G. MAIER, H. BROOME, *Assistant Examiners.*